US009313397B2

(12) United States Patent
Harris et al.

(10) Patent No.: US 9,313,397 B2
(45) Date of Patent: Apr. 12, 2016

(54) REALTIME CAPTURE EXPOSURE ADJUST GESTURES

(71) Applicant: Apple Inc., Cupertino, CA (US)

(72) Inventors: Elliott B. Harris, San Francisco, CA (US); Jeffrey Brasket, San Francisco, CA (US); Justin S. Titi, Morgan Hill, CA (US); Johnnie B. Manzari, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/292,209

(22) Filed: May 30, 2014

(65) Prior Publication Data

US 2015/0350533 A1 Dec. 3, 2015

(51) Int. Cl.
*H04N 5/232* (2006.01)
*H04N 5/235* (2006.01)

(52) U.S. Cl.
CPC ......... *H04N 5/23216* (2013.01); *H04N 5/2355* (2013.01); *H04N 5/23293* (2013.01)

(58) Field of Classification Search
CPC .................................................. H04N 5/243
USPC ........................................ 348/333.01, 229.1
See application file for complete search history.

(56) References Cited

U.S. PATENT DOCUMENTS

| | | | |
|---|---|---|---|
| 8,259,208 B2 | 9/2012 | Ciurea et al. | |
| 8,670,060 B2 | 3/2014 | Jones et al. | |
| 2011/0019058 A1 | 1/2011 | Sakai et al. | |
| 2011/0157089 A1 | 6/2011 | Rainisto | |
| 2011/0176039 A1* | 7/2011 | Lo | 348/294 |
| 2012/0120277 A1* | 5/2012 | Tsai | 348/223.1 |
| 2012/0240041 A1* | 9/2012 | Lim et al. | 715/702 |
| 2012/0242852 A1 | 9/2012 | Hayward et al. | |
| 2013/0010170 A1 | 1/2013 | Matsuzawa et al. | |
| 2013/0141362 A1 | 6/2013 | Asanuma | |
| 2014/0079279 A1* | 3/2014 | Pulli et al. | 382/100 |
| 2014/0118601 A1* | 5/2014 | Myung | 348/333.11 |
| 2014/0351753 A1* | 11/2014 | Shin et al. | 715/810 |
| 2014/0359438 A1* | 12/2014 | Matsuki | 715/702 |
| 2015/0128093 A1* | 5/2015 | McCarthy | 715/863 |

FOREIGN PATENT DOCUMENTS

| | | |
|---|---|---|
| EP | 2482543 | 8/2012 |
| EP | 2728852 | 5/2014 |

OTHER PUBLICATIONS

Search Report and Written Opinion from PCT Application No. PCT/US2015/027355 dated Jul. 23, 2015.

* cited by examiner

*Primary Examiner* — James Hannett
(74) *Attorney, Agent, or Firm* — Novak Druce Connolly Bove + Quigg LLP

(57) ABSTRACT

Disclosed herein are systems, device, methods, and non-transitory computer-readable storage media for enabling semi-manual media capture. Semi-manual media capture can involve calculating optimal exposure settings in an auto-exposure loop, displaying a scene with optimal exposure settings in real time, receiving a manual adjust gesture, and adjusting the scene, in real time, based on the manual adjust gesture.

16 Claims, 8 Drawing Sheets

REALTIME CAPTURE EXPOSURE ADJUST GESTURES

BACKGROUND

1. Technical Field

The present disclosure relates to capturing media and more specifically to using exposure settings to display and record media.

2. Introduction

Some image capturing devices automatically adjust focus settings and exposure settings. These automatic devices can display image frames in real time on a screen and can capture frame(s) according to the automatic settings. However, automatic solutions oftentimes result in undesirable or unintended results. For example, auto-focus cameras can select an object for focus that is contrary to the user's intention. Also, some users desire the ability to adjust the automatic settings that are applied by an auto-focus camera or add artistic touches to a scene. However, auto-focus devices do provide this level of control.

Other image capturing devices allow users to change lenses, manually adjust focus, change shutter speed, select film, etc. However, manually adjusting an image capture device to optimal settings can very difficult and time consuming.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, devices, methods, and non-transitory computer-readable storage media for semi-manual media capture. Semi-manual media capture can involve calculating optimal exposure settings in an auto-exposure loop, displaying a scene with optimal exposure settings in real time, receiving a manual adjust gesture, and adjusting the scene, in real time, based on the manual adjust gesture.

Some embodiments of the present technology can involve receiving a tap gesture on a touch sensitive screen and, in response, displaying an interface element for manually adjusting exposure settings. The tap gesture can lock an auto-exposure loop such that manual adjustments to the exposure setting are displayed in real time the screen. The manual adjustment interface element can be a virtual slider that can be manipulated using finger swipe gestures.

In some embodiments, the media capture device can interpret slide gestures differently based on the speed of the slide gesture, on the range of movement of the slider, etc. Additionally, multiple gestures can be used to progressively fine-tune exposure adjustments.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The present disclosure addresses the need in the art for semi-manual media capture. A system, method and non-transitory computer-readable media are disclosed which allows manual adjustment of automatic exposure settings in real time.

Figure 1:
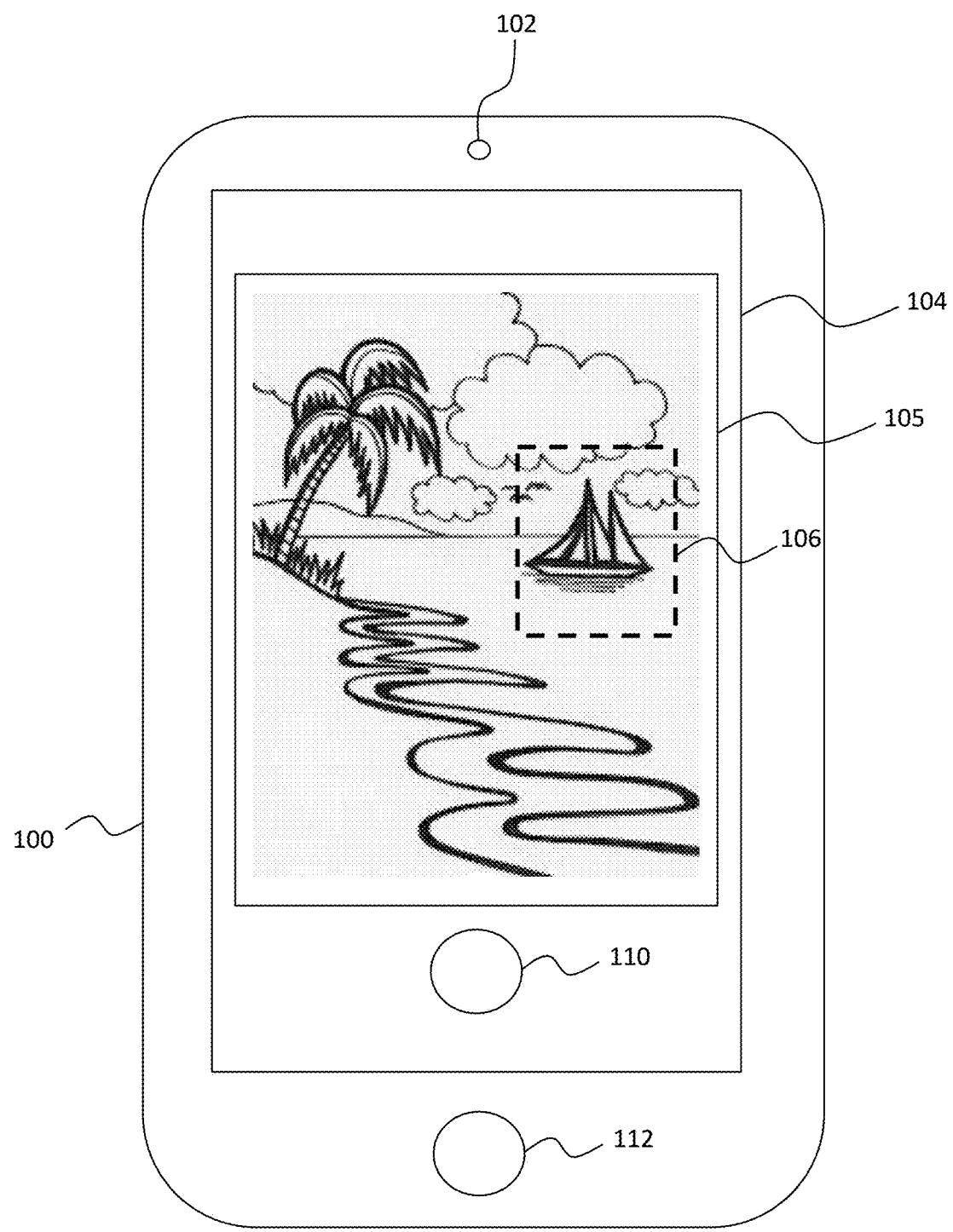
FIG. 1 illustrates an example media capture device.

FIG. 1 illustrates a media capture device 100 during a media capture process to capture a digital image(s), digital video, audio signals, etc. The media capture device 100 may be a digital camera or a mobile multifunction device such as a cellular telephone, a personal digital assistant, or a mobile entertainment device or any other portable handheld electronic device that has a built-in digital camera and a touch sensitive screen.

The media capture device 100 includes a camera lens 102 configured for receiving incident light of a scene to be captured. The lens may be a fixed optical lens system or it may have focus and optical zoom capability. Although not depicted in FIG. 1, the media capture device 100 also includes an electronic image sensor and associated hardware circuitry and running software that can capture digital images or video of a scene that is before the camera lens 102. Additionally, the media capture device 100 can include multiple cameras (e.g. front- and rear-facing cameras).

The digital camera functionality of the device 100 includes an electronic or digital viewfinder 105. The viewfinder 105 displays live captured video (e.g., series of images) or still images of the scene that is before the camera, on a portion of a touch sensitive screen 104 as shown. The digital camera can also include a soft or virtual shutter button whose icon 110 is displayed on the screen 104. As an alternative or in addition, a physical shutter button (not shown) may be implemented in the media capture device 100.

In some embodiments, the media capture device 100 may be placed in either the digital camera mode or the mobile telephone mode, in response to, for example, the user actuating a physical menu button 112 and then selecting an appropriate icon on the touch sensitive screen 104. The media capture device 100 includes all of the needed circuitry and/or software for implementing the digital camera functions of the viewfinder 105, shutter release, and automatic image capture parameter adjustment (e.g., automatic exposure, automatic focus, automatic detection of a scene change) as described below.

The media capture device 100 can receive physical inputs from a user that can be translated and used to perform a selection of one or more regions of interest on the touch sensitive screen 104 as shown by, for example, tapping the screen with a stylus or finger or by gestures such as touch and drag. The user is able to freely position the selections of regions of interest on a preview portion of the touch screen without being limited to predefined areas.

The media capture device 100 can detect the selection of a region of interest and can draw a bounding shape (in this case, the closed contour that has a box shape), substantially centered on the location of the selected region of interest. In some embodiments, the media capture device 100 can automatically detect an object (e.g. a face) in the video displayed on the viewfinder 105 and drawing a bounding shape 106 on the object.

Acquisition of the image from the image sensor (for display in the viewfinder 105 and for media capture) can be controlled based on the characteristics of the image on the image sensor as a whole or based on the characteristics of the image sensor in the selected regions of interest. The characteristics of the image are detected by the image sensor and processed using a processor referencing a collection of exposure settings (explained in greater detail below).

In some embodiments, the focus and exposure settings are automatically adjusted based on the characteristics of the image. For example, an image processor (described below) can analyze the characteristics of an image on the image sensor, automatically focus based on the characteristics of the image, and adjust exposure settings based on the focal point(s) and the characteristics of the image.

In some embodiments of the present technology, the media capture device includes a camera with a fixed aperture. In these cases, adjusting the auto-exposure settings involves changing ISO sensitivity and shutter speed in tandem. For example, as the shutter speed gets quicker, the ISO can get larger. A more thorough discussion of exposure settings is provided below.

Adjustment of focus and exposure settings can be performed in an auto-exposure loop that iteratively receives image data from the image sensor about the scene being framed, manual focus information, flash settings, filters, etc. and automatically determines exposure settings. Additionally, the media capture device 100 can display image frames on the viewfinder 105 according to automatically- or manually-selected focal point(s) and according to the exposure settings.

In some embodiments, the media capture device 100 can shift focus to the selected regions of interest and adjust exposure setting accordingly. For example, for a scene with a person in the foreground and a person in the background in which the image processor automatically focuses the image on the person in the foreground, selection of a region near the person in the background can cause the image processor to re-focus the image on the selected region and adjust exposure settings accordingly.

In some embodiments, the media capture device 100 can receive a gesture or gestures that allow a user to manually adjust the automatic settings when a region of interest is selected for focus. A first gesture can cause the auto-exposure loop to lock in focus on a particular region and additional gestures can be used to manually adjust exposure settings.

For example, the media capture device 100 can receive a tap gesture to lock an auto-exposure loop and cause the media capture device 100 to display an interface element indicating that a further gesture can be used to manually adjust exposure settings. The media capture device 100 can receive the further gestures (e.g. finger swipe gestures), adjust automatic exposure settings based on the gestures, and display, in real time, the how the gestures affect the video displayed on the viewfinder 105 and affect how a image(s) will be captured by the media capture device.

Also, while a two gesture (i.e. tap and slide) process is explained and illustrated herein, any number of other gestures/gesture combinations can be used to manually adjust auto-exposure. For example, a media capture device can interpret touch gestures as exposure adjustment gestures without requiring the user to tap a region of interest first. Also, the media capture device can interpret touch gestures as exposure adjustment gestures without rendering the slider.

Figure 2A:
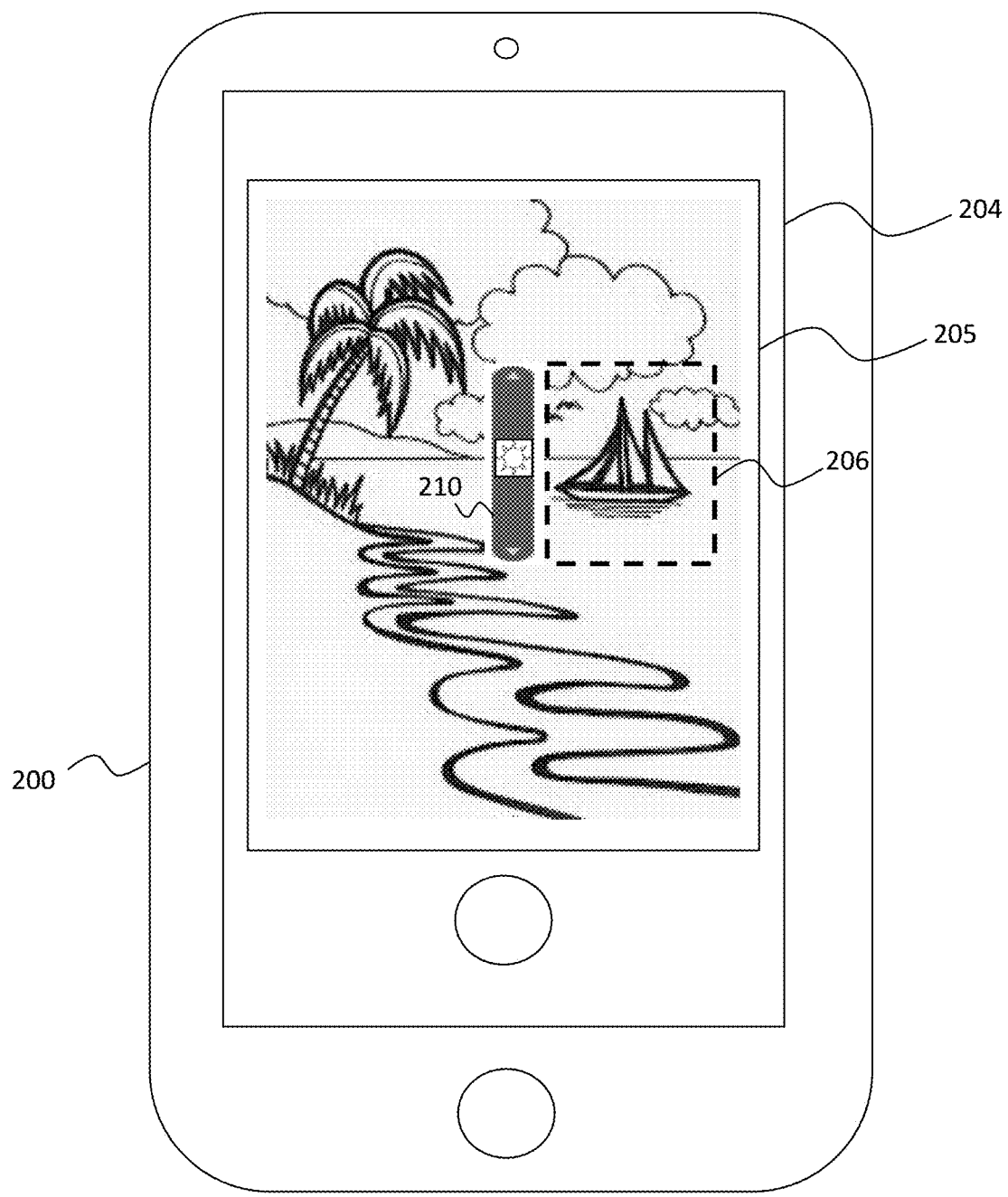
FIGS. 2A-2C illustrate interface elements used to lock the auto-exposure loop and manually adjust exposure settings according to some embodiments of the present technology.
Figure 2B:
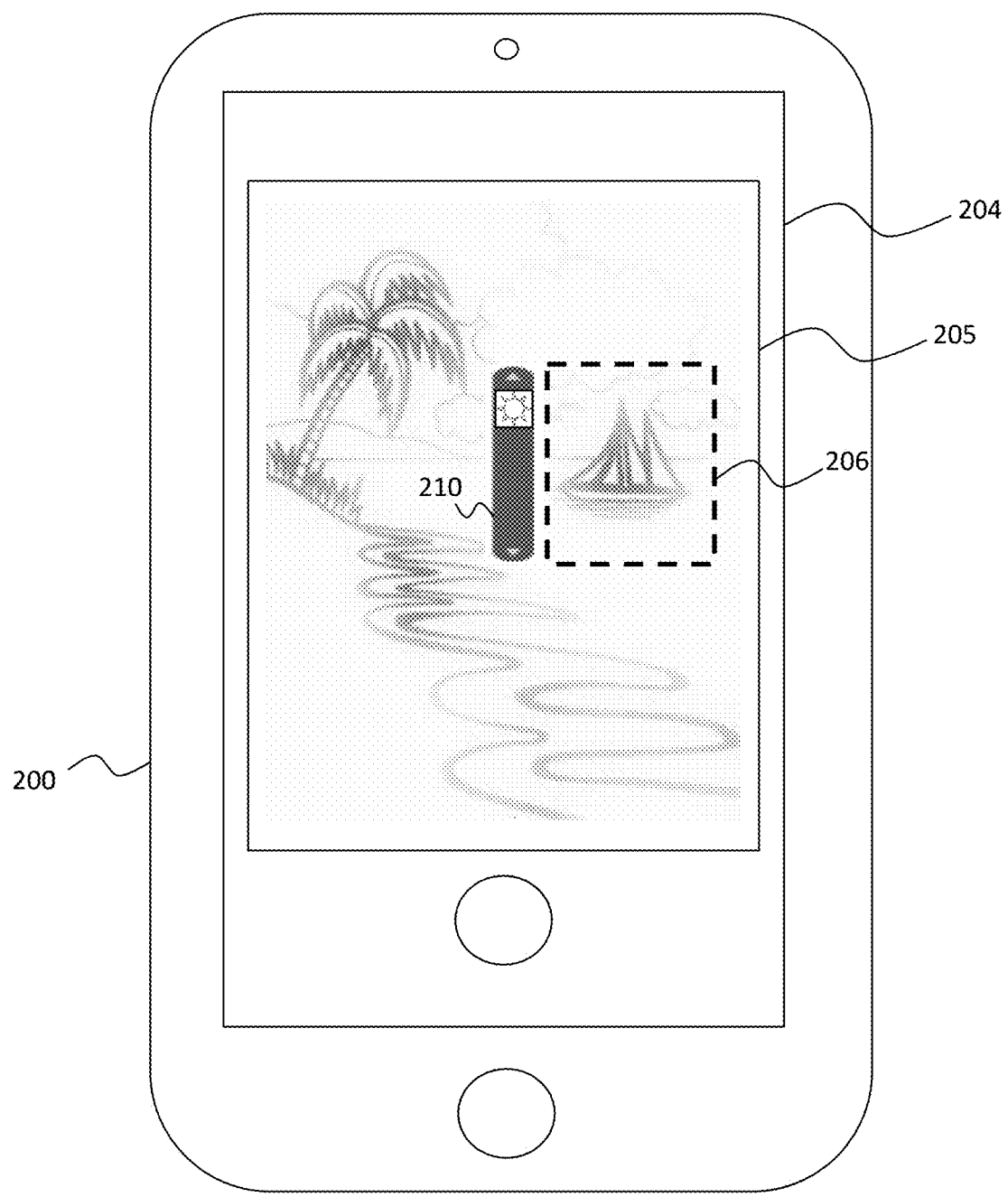
Figure 2C:
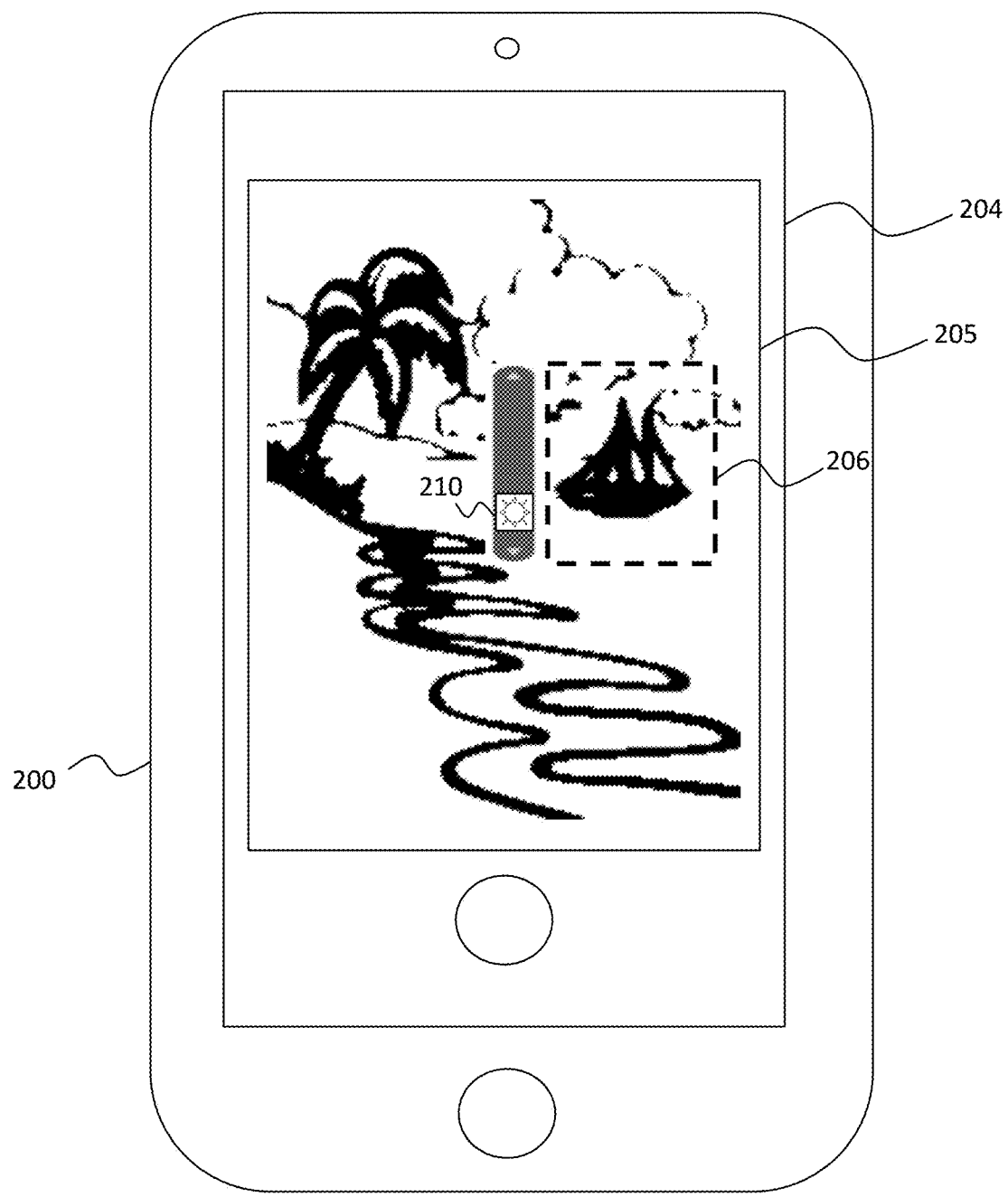

FIGS. 2A-2C illustrate interface elements displayed on a media capture device 100 in response to a user gesture that can be used to lock the auto-exposure loop and manually adjust exposure settings according to some embodiments of the present technology.

In FIG. 2A, a media capture device 200 includes a touch sensitive screen 204 displaying a media capture viewfinder 205 depicting video frames of a scene 299 to be captured. A bounding box 206 surrounds a region of the scene 299 that was selected as a region for focus by a user's tap gesture. Additionally, a virtual interactive slider 210 is displayed adjacent to the bounding box 206. The slider 210 can be further manipulated by the user to manually adjust auto-exposure settings.

Sometimes users of a media capture device 200 will not be interested in adjusting auto-exposure settings. Accordingly, in some embodiments of the present technology, the slider 210 can be temporarily displayed to serve as a visual indication that manual adjustment is possible. In this case, if the user does not further manipulate the slider 210, it can fade away.

FIG. 2B illustrates the touch sensitive screen 204 displaying a media capture viewfinder 205 after receiving a slide-up gesture(s) by a user via the virtual interactive slider 210. As depicted by the washed out lines of the scene 299, the scene 299 is over-exposed as a result of user adjusting the auto-exposure settings via the slider 210.

Similarly, FIG. 2C illustrates the touch sensitive screen 204 displaying a media capture viewfinder 205 after receiving a slide-down gesture(s) by a user via the virtual interactive slider 210. As depicted by the heavy lines of the scene 299, the scene 299 is under-exposed as a result of user adjusting the auto-exposure settings via the slider 210.

While the manual adjustment capability described in FIG. 2 involves displaying an interface feature and requiring that the manual adjustment gestures are directed to the interface feature, the present technology can also involve translating gestures to manual adjustments without the use of interface elements. For example, the media capture device can interpret a particular multi-touch gesture (e.g. two-finger swipe, three-finger rotate, etc.) as an instruction to adjust auto-exposure settings. Also, although the discussion of FIG. 2 involves the media capture device 200 receiving a tap gesture before displaying a manual adjustment interface feature (e.g.), other embodiments can include manual adjustment capabilities being omnipresent or being triggered by some other event (e.g. a speech command).

In some embodiments of the present technology, slide gestures can be made anywhere on the screen (e.g. do not have to originate over the slider) to make manual adjustments. Also, the distance that the slider element is moved on screen is not necessarily the same distance covered by the gesture. For example, to get to the top and bottom of the slider, a user might need to make multiple slide gestures. Furthermore, the speed of a slide gesture can be considered when determining how to adjust exposure settings, as explained in greater detail below.

Although a graphical element for adjusting the exposure settings is explicitly mentioned, it will be apparent to those with ordinary skill in the art having the benefit of this disclosure that a wide variety of other adjustment techniques can be applied with similar effectiveness. Likewise, the use of the words "manually" and "manipulate" should not be limited to their etymological root (i.e. from Latin manualis "of or belonging to the hand"); for example, in some embodiments of the present technology, exposure adjustments can be made via voice controls.

As explained above, the characteristics of the images displayed on, and captured by, the media capture device are dictated by an auto-exposure loop and modified by manual adjustments. The exposure settings used in the auto-exposure loop can be stored in a memory location in a media capture device and processed by a processor in the media capture device upon receiving image data with an image sensor.

Figure 3:
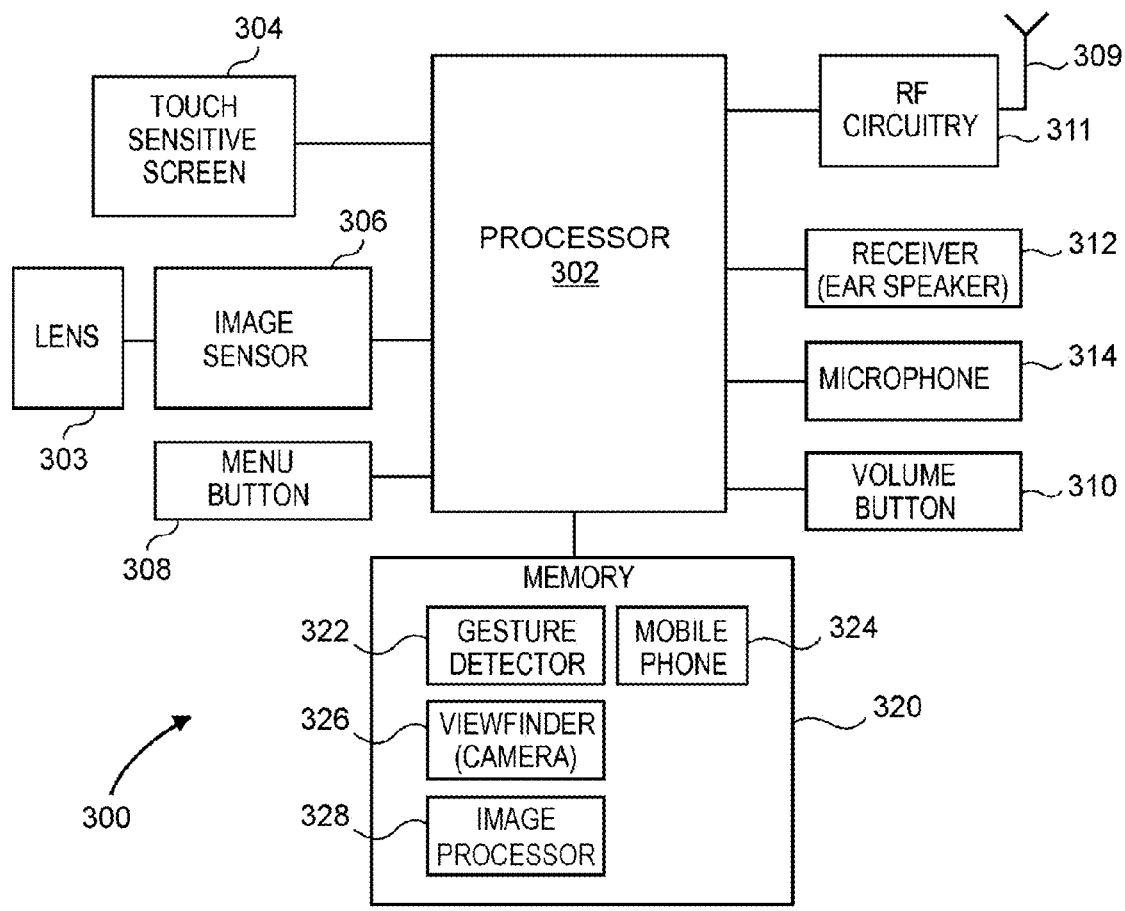
FIG. 3 is a block diagram of an exemplary media capture device.

FIG. 3 is a block diagram of an exemplary media capture device 300, in accordance with some embodiments of the technology. The media capture device 300 may be a personal computer, such as a laptop, tablet, or handheld computer. Alternatively, the media capture device 300 may be a cellular phone handset, personal digital assistant (PDA), or a multi-function consumer electronic device, such as the IPHONE® device.

The media capture device 300 has a processor 302 that executes instructions to carry out operations associated with the media capture device 300. The instructions may be retrieved from memory 320 and, when executed, control the reception and manipulation of input and output data between various components of media capture device 300. Memory 320 may be or include a machine-readable medium.

Although not shown, the memory 320 may store an operating system program that is executed by the processor 302, and one or more application programs are said to run on top of the operating system to perform different functions described below. A touch sensitive screen 304 displays a graphical user interface (GUI) to allow a user of the media capture device 300 to interact with various application programs running in the media capture device 300. The GUI displays icons or graphical images that represent application programs, files, and their associated commands on the screen 304. These may include windows, fields, dialog boxes, menus, buttons, cursors, scrollbars, sliders, etc. During operation, the user can select and activate various graphical images to initiate functions associated therewith.

The touch screen 304 also acts as an input device, to transfer data from the outside world into the media capture device 300. This input is received via, for example, the user's finger(s) touching the surface of the screen 304. The screen 304 and its associated circuitry recognize touches, as well as the position and perhaps the magnitude of touches and their duration on the surface of the screen 304. These may be done by a gesture detector program 322 that may be executed by the processor 302. In other embodiments, an additional, dedicated processor may be provided to process touch inputs, in order to reduce demand on the main processor 302 of the system. Such a gesture processor would be coupled to the screen 304 and the main processor 302 to perform the recognition of screen gestures and provide indications of the recognized gestures to the processor 302. An additional gesture processor may also perform other specialized functions to reduce the load on the main processor 302, such as providing support for the visual display drawn on the screen 304.

The touch sensing capability of the screen 304 may be based on technology such as capacitive sensing, resistive sensing, or other suitable solid-state technologies. The touch sensing may be based on single point sensing or multi-point or multi-touch sensing. Single point touch sensing is capable of only distinguishing a single touch, while multi-point sensing is capable of distinguishing multiple touches that occur at the same time.

Camera functionality of the media capture device 300 may be enabled by the following components. An image sensor 306 (e.g., CCD, CMOS based device, etc.) is built into the media capture device 300 and may be located at a focal plane of an optical system that includes the lens 303. An optical image of a scene before the camera is formed on the image sensor 306, and the sensor 306 responds by capturing the scene in the form of a digital image or picture or video consisting of pixels that will then be stored in the memory 320. The image sensor 306 may include an image sensor chip with several options available for controlling how an image is captured. These options are set by image capture parameters that can be adjusted automatically, by the image processor application 328. The image processor application 328 can make automatic adjustments (e.g., automatic exposure mechanism, automatic focus mechanism, automatic scene change detection, continuous automatic focus mechanism, color balance mechanism), that is without specific user input, to focus, exposure and other parameters based on selected regions of interest in the scene that is to be imaged.

In other embodiments, an additional, dedicated processor may be provided to perform image processing, in order to reduce demand on the main processor 302 of the system. Such an image processor would be coupled to the image sensor 306, the lens 303, and the main processor 302 to perform some or all of the image processing functions. The dedicated image processor might perform some image processing functions independently of the main processor 302 while other may be shared with the main processor.

The image sensor 306 collects electrical signals during an integration time and provides the electrical signals to the image processor 328 as a representation of the optical image formed by the light falling on the image sensor. An analog front end (AFE) may process the electrical signals provided by the image sensor 306 before they are provided to the image processor 328. The image processor 328 can adjust the integration time of the image sensor.

In some embodiments, the media capture device 300 includes a built-in digital camera and a touch sensitive screen. The digital camera includes a lens to form optical images stored in memory. The touch sensitive screen, which is coupled to the camera, displays the images or video. The device further includes a processing system (e.g., processor 302), which is coupled to the screen. The processing system may be configured to receive multiple user selections (e.g., a tap, a tap and hold, a single finger gesture, and a multi-finger gesture) of regions of interest displayed on the touch sensitive screen. The processing system may be further configured to initiate a touch to focus mode based on the user selections. The touch to focus mode automatically focuses the subjects within the selected regions of interest. The processing system may be configured to automatically monitor a luminance distribution of the regions of interest for images captured by the device to determine whether a portion of a scene associated with the selected regions of interest has changed.

The processing system may be configured to automatically determine a location of the focus area based on a location of the selected regions of interest. The processing system may be configured to terminate the touch to focus mode if the scene changes and to initiate a default automatic focus mode. For the default automatic focus mode, the processing system can set an exposure metering area to substantially full screen, rather than being based on the selected regions of interest. For the default automatic focus mode, the processing system can move a location of the focus area from the selected regions of interest to a center of the screen.

In one embodiment, an automatic scene change detect mechanism automatically monitors a luminance distribution of the selected regions of interest. The mechanism automatically compares a first luminance distribution of the selected region for a first image and a second luminance distribution of the selected region for a second image. Then, the mechanism automatically determines whether a scene has changed by comparing first and second luminance distributions of the selected region for the respective first and second images.

The media capture device 300 may operate not just in a digital camera mode, but also in a mobile telephone mode. This is enabled by the following components of the media capture device 300. An integrated antenna 309 that is driven and sensed by RF circuitry 311 is used to transmit and receive cellular network communication signals from a nearby base station (not shown). A mobile phone application 324 executed by the processor 302 presents mobile telephony options on the touch sensitive screen 104 for the user, such as a virtual telephone keypad with call and end buttons. The mobile phone application 324 also controls at a high level the two-way conversation in a typical mobile telephone call, by allowing the user to speak into the built-in microphone 314 while at the same time being able to hear the other side of the conversation through the receive or ear speaker 312. The mobile phone application 324 also responds to the user's selection of the receiver volume, by detecting actuation of the physical volume button 310. Although not shown, the processor 302 may include a cellular base band processor that is responsible for much of the digital audio signal processing functions associated with a cellular phone call, including encoding and decoding the voice signals of the participants to the conversation.

The media capture device 300 may be placed in either the digital camera mode or the mobile telephone mode, in response to, for example, the user actuating a physical or virtual (soft) menu button 308 (e.g., 112 in FIGS. 1 and 2) and then selecting an appropriate icon on the display device of the touch sensitive screen 304. In the telephone mode, the mobile phone application 324 controls loudness of the receiver 312, based on a detected actuation or position of the physical volume button 310. In the camera mode, the camera application 328 can respond to actuation of a button (e.g., the volume button 310) as if the latter were a physical shutter button (for taking pictures). This use of the volume button 310 as a physical shutter button may be an alternative to a soft or virtual shutter button whose icon is simultaneously displayed on the display device of the screen 304 during camera mode and is displayed near the preview portion of the display device of the touch sensitive screen 304.

An embodiment of the technology may be a machine-readable medium having stored thereon instructions which program a processor to perform some of the operations described above. A machine-readable medium may include any mechanism for storing information in a form readable by a machine (e.g., a computer), not limited to Compact Disc Read-Only Memory (CD-ROMs), Read-Only Memory (ROMs), Random Access Memory (RAM), and Erasable Programmable Read-Only Memory (EPROM). In other embodiments, some of these operations might be performed by specific hardware components that contain hardwired logic. Those operations might alternatively be performed by any combination of programmed computer components and custom hardware components.

In some embodiments of the present technology, signal-processing firmware controls the camera exposure. The overall exposure gain can be distributed among: image sensor exposure time, image sensor analog gain, image sensor digital gain and image signal processor digital gain, following a set of rules including hardware constraints and software tuning preferences. The manual adjustment received via the user interface (e.g. the slider) sets up an exposure bias, in reference to the normal auto exposure. When the image signal processor firmware receives the command to apply an exposure bias, it will re-adjust the image sensor exposure time and various gains to meet the requirements.

In some embodiments, the auto-exposure control is a closed loop state machine. The image statistics that the image signal processor gathers provide a measure of exposure level for each frame, and the auto-exposure state machine makes sure the final exposure converges to the exposure target. The exposure target can be controlled by the auto-exposure algorithm and by the manual adjustment received via the user interface (e.g. the slider).

Figure 4:
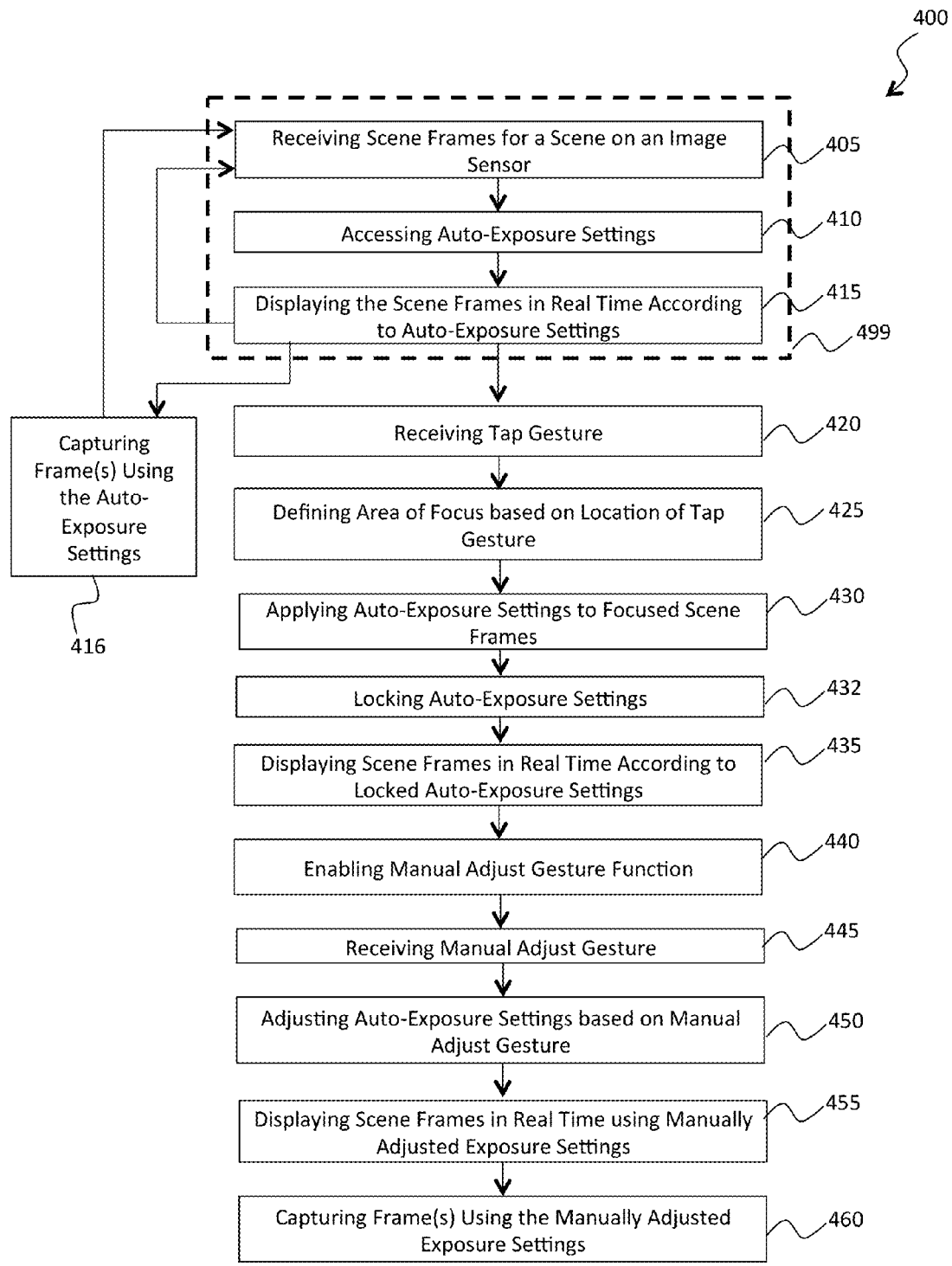
FIG. 4 illustrates an exemplary method of manually adjusting auto-exposure settings for the entire scene for real-time display and image capture.

FIG. 4 illustrates an exemplary method 400 of receiving a tap gesture to select an region of user-defined focus and receiving an additional gesture for manually adjusting auto-exposure settings for the entire scene for real-time display and image capture.

The method 400 involves an auto-exposure loop 499 that includes receiving scene frames for a scene to be captured on an image sensor 405, accessing automatic exposure settings 410 (e.g. from memory 320), and displaying, on the media capture device, the scene frames in real-time according to the auto-exposure settings 415. The method 499 can also involve capturing image frames using the auto-exposure settings 416.

Next, the method 400 involves receiving a tap gesture 420 on a region of interest. For example, the region of interest can include a face in the scene, multiple faces in the scene, an object in the background of the scene, the horizon behind objects in the scene, etc. Based on the location of the object(s) defined by the tap gesture, the method 400 involves defining an area of focus 425 that is used as a basis for focusing image capture using auto-exposure settings. The method 400 applies auto-exposure settings to the focused scene based on the region of interest specified in the tap gesture 430. In some embodiments, the method 400 involves locking the auto-exposure settings based on the specified region of interest 432.

After a tap gesture is received, the method 400 involves displaying, on the viewfinder, real-time scene frames according to the locked auto-exposure settings 435 and enabling a manual exposure adjustment gesture function 440. In some cases, enabling a manual exposure adjustment gesture function 440 involves displaying a manual exposure adjustment user interface element. Besides receiving gestures via a manual exposure adjustment user interface element, a wide variety of techniques for allowing manual adjustment will be readily apparent to those with ordinary skill in the art having the benefit of this disclosure including receiving specified touch gestures in the absence of interface elements, using physical volume buttons, device tilting events detected by an accelerometer, voice commands, etc.

The method 400 continues with receiving a manual adjustment gesture 445, adjusting the auto-exposure settings based on the manual adjust gesture 450, and displaying scene frames in real time using the manually adjusted exposure settings 455. Additionally, the method can involve capturing scene frames using the manually adjusted exposure settings 460.

As explained above, the media capture device can include a camera with a fixed aperture. Consequently, these cameras cannot change the focal ratio (i.e. f-stop) in a traditional sense. Accordingly, for the purpose of illustrating the effects of adjustments to exposure settings, the following references to stops, and adjustment thereto, shall mean adjustment to other exposure settings that affect the image characteristics in substantially equivalent ways that traditional adjustment to an aperture would. For example, a camera with a fixed aperture can adjust ISO and shutter speed to a particular degree that will affect sensor exposure to light and image capture in a substantially equivalent fashion as changing the focal ratio.

In some embodiments of the present technology, a manual exposure adjustment interface element can interpret received gestures differently depending on the nature of the gesture. For example, in the case of the manual exposure adjustment interface element being a slider, the media capture device can interpret slide gestures differently based on the speed of the slide gesture, on the range of movement of the slider, etc.

Additionally, the manual exposure adjustment interface element can be configured to interpret multiple gestures to progressively fine-tune exposure adjustments. For example, in the case of the manual exposure adjustment interface element being a slider, the media capture device can interpret a first slide gesture as a gross adjustment to the auto-exposure settings (e.g. the slider element being configured to adjust the exposure settings the one full exposure stop in either direction from the middle of the slider). In the same example, the media capture device can: interpret a second slide gesture as a more fine-tune adjustment to the auto-exposure settings (e.g. the slider element being configured to adjust the exposure settings a half of an exposure stop in either direction from the middle of the slider), interpret a third slide gesture as an even more fine-tune adjustment to the auto-exposure settings (e.g. the slider element being configured to adjust the exposure settings an eighth of an exposure stop in either direction from the middle of the slider), and so on.

In some embodiments, the manual exposure adjustment interface element can be configured to dynamically adjust the amount of adjustment made to exposure settings in response to users' gestures. For example, in the case of the manual exposure adjustment interface element being a slider, the media capture device can require multiple sliding gestures to reach the terminal ends of the slider. In this same example, each slide gesture can provide the user with the ability to increase or decrease the exposure the equivalent of one exposure stop, thereby allowing a wide range of exposure adjustment capability over multiple slide gestures along with fine-grain adjustment ability within each gesture.

Figure 5A:
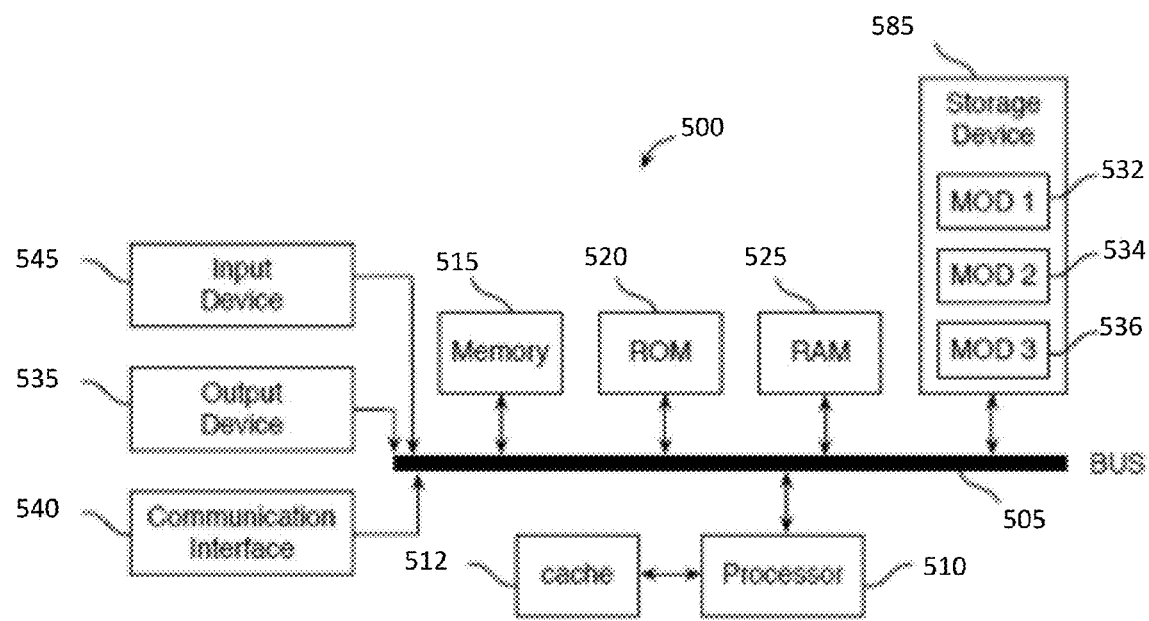
FIG. 5A and FIG. 5B illustrate exemplary possible system embodiments.
Figure 5B:
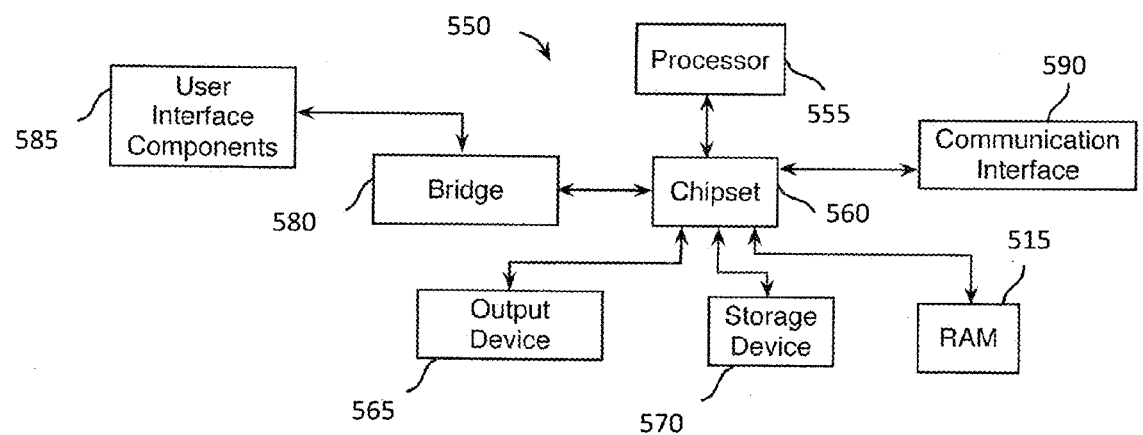

FIG. 5A and FIG. 5B illustrate exemplary possible system embodiments. The more appropriate embodiment will be apparent to those of ordinary skill in the art when practicing the present technology. Persons of ordinary skill in the art will also readily appreciate that other system embodiments are possible.

FIG. 5A illustrates a conventional system bus computing system architecture 500 wherein the components of the system are in electrical communication with each other using a bus 505. Exemplary system 500 includes a processing unit (CPU or processor) 510 and a system bus 505 that couples various system components including the system memory 515, such as read only memory (ROM) 520 and random access memory (RAM) 525, to the processor 510. The system 500 can include a cache of high-speed memory connected directly with, in close proximity to, or integrated as part of the processor 510. The system 500 can copy data from the memory 515 and/or the storage device 530 to the cache 512 for quick access by the processor 510. In this way, the cache can provide a performance boost that avoids processor 510 delays while waiting for data. These and other modules can control or be configured to control the processor 510 to perform various actions. Other system memory 515 may be available for use as well. The memory 515 can include multiple different types of memory with different performance characteristics. The processor 510 can include any general purpose processor and a hardware module or software module, such as module 1 532, module 2 534, and module 3 536 stored in storage device 530, configured to control the processor 510 as well as a special-purpose processor where software instructions are incorporated into the actual processor design. The processor 510 may essentially be a completely self-contained computing system, containing multiple cores or processors, a bus, memory controller, cache, etc. A multi-core processor may be symmetric or asymmetric.

To enable user interaction with the computing device 500, an input device 545 can represent any number of input mechanisms, such as a microphone for speech, a touch-sensitive screen for gesture or graphical input, keyboard, mouse, motion input, speech and so forth. An output device 535 can also be one or more of a number of output mechanisms known to those of skill in the art. In some instances, multimodal systems can enable a user to provide multiple types of input to communicate with the computing device 500. The communications interface 540 can generally govern and manage the user input and system output. There is no restriction on operating on any particular hardware arrangement and therefore the basic features here may easily be substituted for improved hardware or firmware arrangements as they are developed.

Storage device 530 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 525, read only memory (ROM) 520, and hybrids thereof.

The storage device 530 can include software modules 532, 534, 536 for controlling the processor 510. Other hardware or software modules are contemplated. The storage device 530 can be connected to the system bus 505. In one aspect, a hardware module that performs a particular function can include the software component stored in a computer-readable medium in connection with the necessary hardware components, such as the processor 510, bus 505, display 535, and so forth, to carry out the function.

FIG. 5B illustrates a computer system 550 having a chipset architecture that can be used in executing the described method and generating and displaying a graphical user interface (GUI). Computer system 550 is an example of computer hardware, software, and firmware that can be used to implement the disclosed technology. System 550 can include a processor 555, representative of any number of physically and/or logically distinct resources capable of executing software, firmware, and hardware configured to perform identified computations. Processor 555 can communicate with a chipset 560 that can control input to and output from processor 555. In this example, chipset 560 outputs information to output 565, such as a display, and can read and write information to storage device 570, which can include magnetic media, and solid state media, for example. Chipset 560 can also read data from and write data to RAM 575. A bridge 580 for interfacing with a variety of user interface components 585 can be provided for interfacing with chipset 560. Such user interface components 585 can include a keyboard, a microphone, touch detection and processing circuitry, a pointing device, such as a mouse, and so on. In general, inputs to system 550 can come from any of a variety of sources, machine generated and/or human generated.

Chipset 560 can also interface with one or more communication interfaces 590 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 555 analyzing data stored in storage 570 or 575. Further, the machine can receive inputs from a user via user interface components 585 and execute appropriate functions, such as browsing functions by interpreting these inputs using processor 555.

It can be appreciated that exemplary systems 500 and 550 can have more than one processor 510 or be part of a group or cluster of computing devices networked together to provide greater processing capability.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

The various embodiments described above are provided by way of illustration only and should not be construed to limit the scope of the disclosure. Those skilled in the art will readily recognize various modifications and changes that may be made to the principles described herein without following the example embodiments and applications illustrated and described herein, and without departing from the spirit and scope of the disclosure.

We claim:

1. A computer-implemented method comprising:
 receiving, with an image sensor of an image capture device, scene frames for a scene to be captured by the image capture device;
 automatically adjusting, by an auto-exposure algorithm, exposure settings of the scene frames to be captured;
 displaying, on a touch-sensitive display of the image capture device, at least one scene frame for the scene to be captured;
 receiving, on the touch-sensitive display, a touch gesture;
 adjusting, by the auto-exposure algorithm, exposure settings for the scene to be captured by focusing on a portion of the scene frames in an area of focus around a location of the touch gesture;
 displaying the scene frames to be captured according to the auto-exposure settings that are adjusted by the touch gesture;
 displaying, upon receiving the touch gesture, a bounding shape substantially centered on the area of focus;
 displaying a slider element substantially adjacent to the bounding shape;
 receiving, on the touch-sensitive display, a slide gesture using the slider element for manually adjusting the auto-exposure settings for the scene frames for the scene to be captured based on the auto-exposure settings for the portion of the scene frames in the area of focus; and
 displaying, on the touch-sensitive display, the scene frames for the scene to be captured using the manually adjusted exposure settings as adjusted by the slide gesture.

2. The computer-implemented method of claim 1, wherein the touch gesture comprises a tap gesture.

3. The computer-implemented method of claim 1, wherein a degree of manual adjustment of the auto-exposure settings depends on a speed of the slide gesture.

4. The computer-implemented method of claim 1,
 wherein a degree of manual adjustment of the auto-exposure settings for the scene frames to be captured based on the auto-exposure settings for the portion of the scene frames in the area of focus depends on a range that the slide gesture moves.

5. The computer-implemented method of claim 1, further comprising:

receiving an additional slide gesture using the slider element wherein the additional touch gesture more-finely adjusts the auto-exposure settings for the scene frames for the scene to be captured based on the auto-exposure settings for the portion of the scene frame in the area of focus.

6. A media capture device comprising:
a touch-sensitive display for displaying scene frames and accepting touch gestures;
an image sensor configured to receive scene frames for a scene to be captured;
a device memory storing an auto-exposure algorithm that is used to automatically define auto-exposure settings for the image capture device based on the scene frames;
a processor configured to:
   display, according to the auto-exposure settings, at least one scene frame for a scene to be captured to be displayed on the touch-sensitive display;
   interpret a touch gesture received on the touch-sensitive display;
wherein the touch-sensitive is further configured to display a bounding shape substantially centered on an area of focus around a location of the touch gesture;
wherein the processor is further configured to adjust, using the auto-exposure algorithm, the exposure settings for the scene frames to be captured by focusing on a portion of the scene frames in an area of focus around the location of the touch gesture; and
   adjust the scene frames displayed on the touch-sensitive display by the auto-exposure algorithm using the adjusted settings;
wherein the touch-sensitive is further configured to:
   display the scene frames to be captured according to the auto-exposure settings that are adjusted by the touch gesture;
   display a slider element substantially adjacent to the bounding shape;
   receive a slide gesture on the slider element for manually adjusting the auto-exposure settings for the scene frames for the scene to be captured based on the auto-exposure settings for the portion of the scene frames in the area of focus;
wherein the processor is further configured to manually adjust the exposure settings, for the scene frames to be captured, as adjusted by the slide gesture; and
wherein the touch-sensitive display is further configured to display, on the touch-sensitive display, the scene frames for the scene to be captured using the manually adjusted exposure settings as adjusted by the slide gesture.

7. The media capture device of claim 6, wherein the processor is further configured to capture a scene frame based on the adjusted exposure settings.

8. A non-transitory computer-readable storage medium comprising:
a medium configured to store computer-readable instructions thereon; and
the computer-readable instructions that, when executed by a processing device cause the processing device to perform a method, comprising:
   receiving, with an image sensor of an image capture device, scene frames for a scene to be captured by the image capture device;
   automatically adjusting, by an auto-exposure algorithm, exposure settings of the scene frames for the scene to be captured;
   displaying, on a touch-sensitive display of the image capture device, at least one scene frame for the scene to be captured;
   receiving, on the touch-sensitive display, a touch gesture;
   adjusting, by the auto-exposure algorithm, exposure settings for the scene frames to be captured by focusing on a portion of the scene frames in an area of focus around a location of the touch gesture;
   displaying, upon receiving the touch gesture, a bounding shape substantially centered on the area of focus;
   displaying a slider element substantially adjacent to the bounding shape;
   receiving, on the touch-sensitive display, a slide gesture using the slider element for manually adjusting the auto-exposure settings for the scene frames for the scene to be captured based on the auto-exposure settings for the portion of the scene frames in the area of focus; and
   displaying, on the touch-sensitive display, the scene frames for the scene to be captured using the manually adjusted exposure settings as adjusted by the slide gesture.

9. The non-transitory computer-readable storage medium of claim 8, the instructions further causing the processing device to perform the step of:
   capturing a scene frame according to the manually adjusted exposure settings as adjusted by the slide gesture.

10. The non-transitory computer-readable storage medium of claim 8, wherein a degree of manual adjustment of the auto-exposure settings depends on a speed of the slide gesture.

11. The non-transitory computer-readable storage medium of claim 8,
   wherein a degree of manual adjustment of the auto-exposure settings for the scene frames to be captured based on the auto-exposure settings for the portion of the scene frames in the area of focus depends on a range that the slide gesture moves.

12. The non-transitory computer-readable storage medium of claim 8, further comprising:
   receiving an additional slide gesture using the slider element, wherein the additional touch gesture more-finely adjusts the auto-exposure settings for the scene frames to be captured based on the auto-exposure settings for the portion of the scene frames in the area of focus.

13. A computer-implemented method comprising:
   receiving, with an image sensor of an image capture device, scene frames for a scene to be captured by the image capture device;
   receiving, on the touch-sensitive display, a tap touch gesture that selects a region of interest of the scene frames;
   adjusting, based on the touch gesture using an auto-exposure algorithm that automatically defines auto-exposure settings for the image capture device based on the scene frames, the auto-exposure settings based on the a portion of scene frames in the region of interest;
   displaying a bounding shape substantially centered on region of interest;
   displaying a first preview of the scene frames of the scene to be captured as adjusted by the touch gesture;
   displaying a slider element substantially adjacent to the region of interest;
   receiving, on the touch-sensitive display, a slide touch gesture using the slider element for manually adjusting the auto-exposure settings for the scene frames based on the auto-exposure settings for the selected region of interest to generate manually adjusted scene frames of the scene to be captured; and displaying a second preview of the manually adjusted scene frames of the scene to be captured.

14. The computer-implemented method of claim 13, wherein a degree of manual adjustment of the auto-exposure settings depends on a speed of the slide touch gesture.

15. The computer-implemented method of claim 13, wherein a degree of manual adjustment of the auto-exposure settings for the scene frames to be captured based on the auto-exposure settings for the portion of the scene frames in an area of focus depends on a range that the slide touch gesture moves.

16. The computer-implemented method of claim 13, further comprising:

receiving an additional slide gesture using the slider element, wherein the additional touch gesture more-finely adjusts the auto-exposure settings for the scene frames for the scene to be captured based on the auto-exposure settings for the portion of the scene frame in the area of focus.

\* \* \* \* \*